United States Patent
Raud et al.

[11] Patent Number: 6,125,341
[45] Date of Patent: Sep. 26, 2000

[54] SPEECH RECOGNITION SYSTEM AND METHOD

[75] Inventors: Henry F. Raud, Pickering; Paul M. Brennan, East York, both of Canada

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/994,450

[22] Filed: Dec. 19, 1997

[51] Int. Cl.[7] .................................................. G01L 15/22
[52] U.S. Cl. ................................. 704/8; 704/255; 704/275
[58] Field of Search ...................................... 704/231, 233, 704/243, 244, 246, 251, 255, 256, 257, 250, 270, 275, 3, 8, 10; 379/88.05, 88.06

[56] References Cited

U.S. PATENT DOCUMENTS

| | | | |
|---|---|---|---|
| 5,428,707 | 6/1995 | Gould et al. | 704/231 |
| 5,488,652 | 1/1996 | Bielby et al. | 704/270 |
| 5,513,298 | 4/1996 | Stanford et al. | 704/243 |
| 5,524,169 | 6/1996 | Cohen et al. | 704/231 |
| 5,634,086 | 5/1997 | Rtischev et al. | 704/257 |
| 5,636,325 | 6/1997 | Farrett | 704/258 |
| 5,689,617 | 11/1997 | Pallakoff et al. | 704/255 |
| 5,758,322 | 5/1998 | Rongley | 704/270 |
| 5,787,394 | 7/1998 | Bahl et al. | 704/238 |
| 5,805,771 | 9/1998 | Muthusamy et al. | 704/232 |
| 5,839,107 | 11/1998 | Gupta et al. | 704/270 |
| 5,987,414 | 11/1999 | Sabourin et al. | 704/270 |

*Primary Examiner*—David R. Hudspeth
*Assistant Examiner*—Martin Lerner

[57] ABSTRACT

A speech recognition system having multiple recognition vocabularies, and a method of selecting an optimal working vocabulary used by the system are disclosed. Each vocabulary is particulary suited for recognizing speech in a particular language, or with a particular accent or dialect. The system prompts a speaker for an initial spoken response; receives the initial spoken response; compares the response to each of a set of possible responses in an initial speech recognition vocabulary to determine a response best matched in the initial vocabulary. A working speech recognition vocabulary is selected from a plurality of speech recognition vocabularies, based on the best matched response.

17 Claims, 4 Drawing Sheets

SPEECH RECOGNITION SYSTEM AND METHOD

FIELD OF THE INVENTION

The present invention relates to a speech recognition system and more particularly, to a speech recognition system having multiple recognition vocabularies, and a method of selecting an optimal working vocabulary used by the system.

BACKGROUND OF THE INVENTION

Present-day speech recognition systems typically comprise a computing device including software and hardware to recognize spoken words. Such systems compare samples of one or more spoken words to samples stored within memory corresponding to words in a set of known words, referred to as a vocabulary.

With current technology, the likelihood that a word will be accurately recognized is inversely proportional to the number of words in the vocabulary. Existing speaker independent recognition systems begin to produce unreliable recognition results with vocabularies having more than about twenty words in the vocabulary. To address this problem, known systems may partition a large vocabulary into smaller vocabularies, only one of which is active at any one time. For example, a speaker independent system may be used to solicit answers to a series of questions. Each question typically only has a number of possible answers, all of which form part of a smaller vocabulary.

To compound recognition problems, vocabularies need to be "tuned" to handle regional dialects, accents and background noise. For example, English words spoken by a native of New York City typically sound different than those spoken by a native of London, England. These differences may further decrease the accuracy of recognition in a speaker independent system, as a single vocabulary can only accommodate a limited variance in the pronunciation of a spoken word.

Known systems address this problem by adapting the speech recognition vocabulary to include numerous variations of each word in the vocabulary. This, however, reduces the number of words that can be contained in a single vocabulary while still expecting reasonable speech recognition performance.

Other systems use completely separate vocabularies, each tuned to a specific dialect, accent or background noise. A suitable vocabulary is used depending on the location or application of a recognition system. For example, if a system is used in London, England a first speaker independent recognition vocabulary is used. If a similar system is used in New York City, a different vocabulary is used. Other known systems, as for example disclosed in U.S. Pat. No. 5,524,169 naming Cohen et al. as inventors, dynamically choose a vocabulary using external indicators of geographic origin of the speaker. For example, a signal derived using the global positioning system to determine the location of the speaker may be used. This approach may improve the recognition accuracy of the system, if an optimal vocabulary is correctly predicted.

This approach, however, is not effective if a speaker's dialect or accent cannot be predicted with any accuracy. This is a particular problem in an area where many dialects of the same language are spoken; in a multi-cultural area where people speak the same language but with varying accents; or in a location, such as an airport or hotel, frequented by travellers. Similarly, people travelling to foreign countries where the main populous speak with different accents, dialects other than their own may not be able to use the local speech recognition systems due to poor speech recognition performance.

Other known speech recognition systems prompt users for additional information to properly determine the speaker's dialect, accent or language. Alternatively, separately configured and selectable versions of the systems, each appropriate for a particular dialect, accent, language or environment (for example quiet/landline vs. noisy/cellular telephones) may be simultaneously available. They may, for example, be selected through the public switched telephone network using distinct telephone numbers.

Similar problems exist with speaker dependent speech recognition systems. Such systems have been "trained" by one or more persons to recognize a person's particular speech patterns. Vocabularies are formed based on system training. Accordingly, vocabularies formed by the system usually only produce accurate recognition results when used by the person who trained the vocabulary. Again, existing systems use external indicia in choosing a suitable vocabulary. For example, a particular computer acting as a recognition system typically utilizes login information in selecting the vocabulary used by the recognition system.

The present invention attempts to overcome some of the disadvantages of known speech recognition systems.

SUMMARY OF THE INVENTION

It is an object of the present invention, to improve speech recognition accuracy in a speech recognition system by selecting an appropriate speech recognition vocabulary.

In accordance with an aspect of the present invention there is provided a method of recognizing speech at a speech recognition system using a plurality of speech recognition vocabularies. The method includes selecting a working speech recognition vocabulary for recognizing speech from the plurality of speech recognition vocabularies based on a response by a user to an initial prompt; receiving a spoken word to be recognized; responding to determining a low likelihood of correctly recognizing the spoken word using the working speech recognition vocabulary by selecting another one of the plurality of speech recognition vocabularies based on a response to a subsequent prompt, for use as the working speech recognition vocabulary; and presenting the user an option of receiving future prompts in a second language different from a language of the initial prompt based on response to at least one of the initial prompt and the subsequent prompt.

In accordance with another aspect of the present invention there is provided a speech recognition speech system, including a processor; an input device in communication the processor; a memory recognition system, including a processor; an input device in communication with storing data corresponding to a plurality of distinct speech recognition vocabulary for recognizing processor is adapted to select a working speech recognition vocabulary for recognizing speech from the plurality of speech recognition vocabularies based on a response by a user to an initial prompt; receive data representative of a spoken word to be recognized; respond to determining a low likelihood of correctly recognizing the spoken word using the working speech recognition vocabulary by selecting another one of the plurality of speech recognition vocabulary. The processor is further adapted to present the user an option of receiving future prompts in a second language different from a language of the initial prompt based on a response to at least one of the initial prompt and the subsequent prompt.

In accordance with yet further aspect of the present invention there is provided a method recognizing speech at a speech recognition system using a plurality of speech recognition vocabularies. The method includes receiving a response to an initial prompt from a user. This response is used to select one of the plurality of speech recognition vocabularies to recognize speech and based on this response, presenting the user an option of receiving subsequent prompts in a language different from the initial prompt.

BRIEF DESCRIPTION OF THE DRAWING

In figures which illustrate, by way of example, embodiments of the present invention.

DETAILED DESCRIPTION

Figure 1:
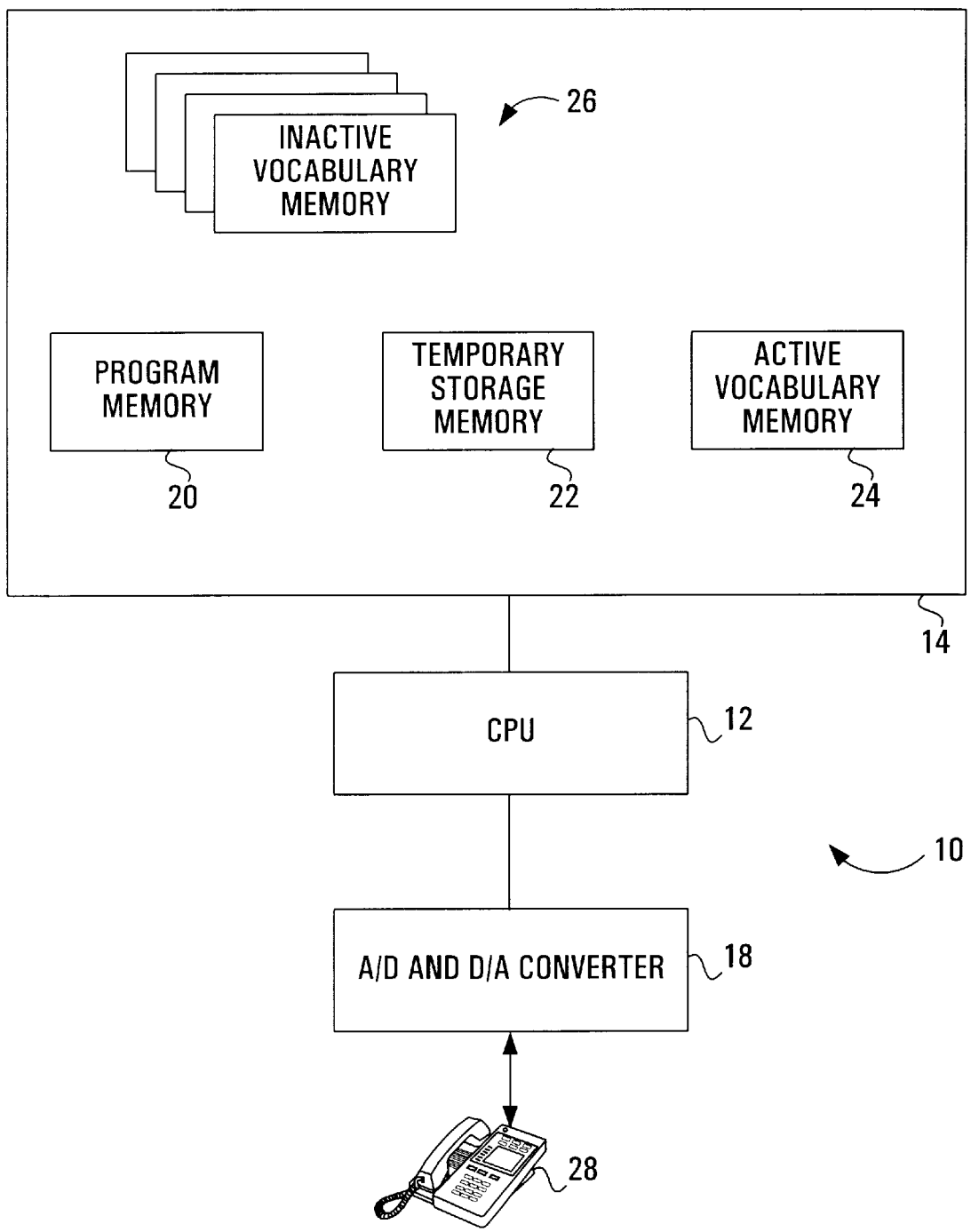
FIG. 1 is a block diagram of a speech recognition system.

FIG. 1 illustrates a speech recognition system 10. The system 10 comprises a central processing unit ("CPU") 12 interconnected by an address and data bus, with memory 14; and analog to digital ("A/D") and digital to analog ("D/A") converter 18. Memory 14 is further divided into program memory 20; temporary storage memory 22; active vocabulary storage memory 24; and inactive vocabulary storage memory 26. An analog sound input and output device, such as a telephone 28 is connected to analog inputs and outputs of A/D and D/A converter 18. Telephone 28 may be connected directly to system A/D and D/A converter 18 or may be indirectly interconnected through, for example, the public switched telephone network, a voice mail system or a private branch exchange.

CPU 12 is a conventional microprocessor. Temporary storage memory 22 and active vocabulary memory 24 are dynamic random access memory. Program memory 20 and inactive vocabulary memory 26 are read-only memory, stored for example on an EPROM, or flash memory device. Inactive vocabulary storage memory 26 may alternatively be a remote storage medium such as a CD-ROM, a disk drive or the like.

Program memory 20 stores processor readable instructions to adapt processor 12 to compare digital representations of analog signals and recognize speech patterns. Program memory 20 also contains instructions that present user prompts at telephone 28 that serves as an interface for use by a speaker. The interface may further comprise a terminal or other display (not shown). The program within memory 14, enables processor 12 to sample speech utterances at the microphone of telephone 28, and compare these to samples of vocabulary entries contained within an active vocabulary stored within active vocabulary memory 24.

Figure 2:
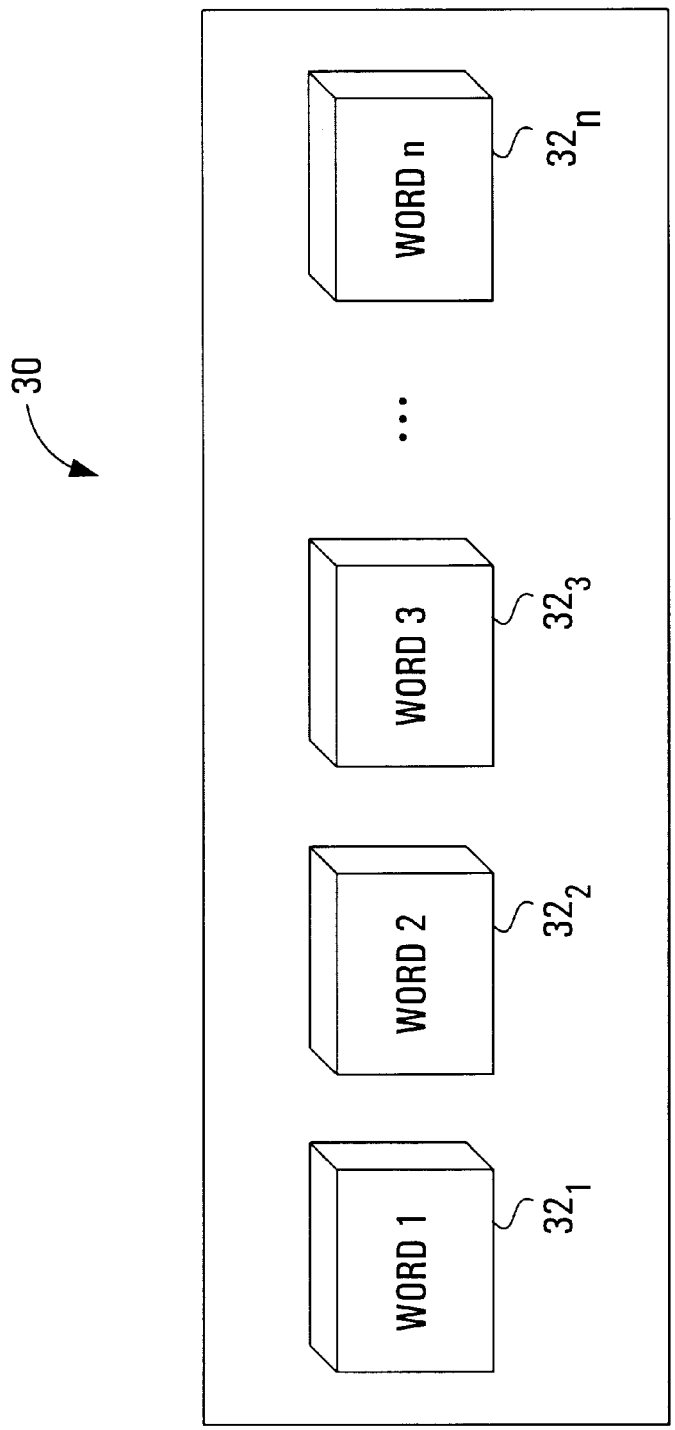
FIG. 2 is a block diagram illustrating the organization of a portion of memory of the system of FIG. 1.

FIG. 2, illustrates the organization of a data block generally marked 30 in a portion of inactive vocabulary memory 26. Data block 30 is referred to as a vocabulary, storing sufficient data to allow recognition of a vocabulary or set of words. As illustrated, data block 30 is comprised of n smaller data blocks $32_1$–$32_n$. Each data block $32a$–$32n$ contains a plurality of bytes containing sufficient data to recognize a single word within the vocabulary, using a conventional speech recognition technique.

For example, speech may be recognized using known Hidden Markov Model recognition techniques. Using known recognition techniques the size of the vocabulary in block 30 preferably limited to less than one hundred words. Depending on the similarity of the words in the vocabulary, a vocabulary size of twenty to fifty words may be more appropriate. Those skilled in the art will appreciate that a variety of recognition techniques will be suitable.

Figure 3:
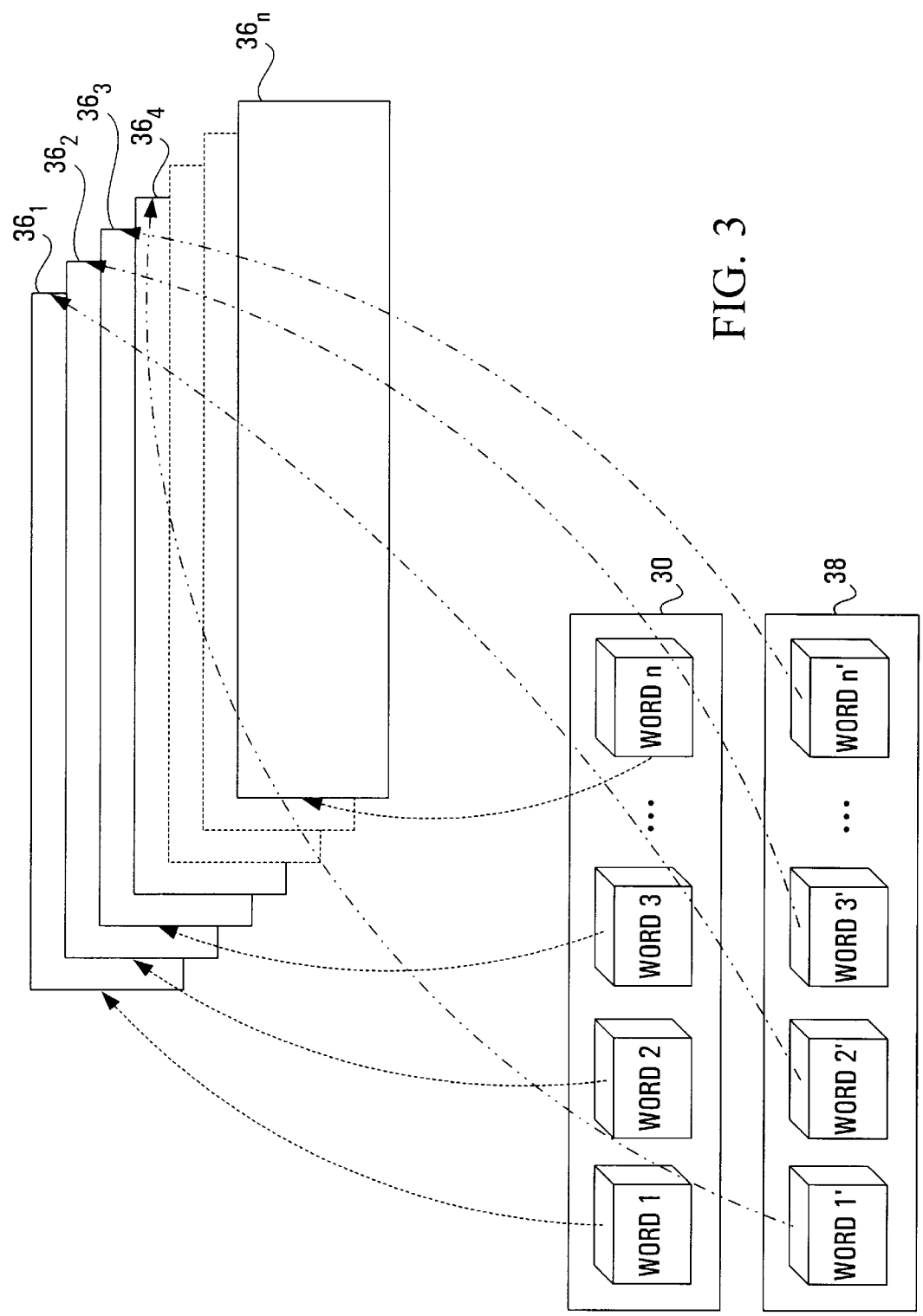
FIG. 3 is a further block diagram illustrating the organization of a portion of memory of the system of FIG. 1.

FIG. 3 illustrates the organization of data stored within inactive vocabulary memory 26. Specifically, inactive vocabulary memory 26 stores a library having a total of n+2 data blocks 30, $36_1$–$36_n$. The format of data block 30 is illustrated in FIG. 2. The format of data blocks $36_1$–$36_n$ and 38 are similar. Each of data blocks $36_1$–$36_n$ and 38 is also referred to as a vocabulary and has a number of smaller data blocks like blocks $32_1$–$32_n$; each smaller data block contains sufficient data to recognize a single spoken word for which recognition data is stored the vocabulary. The total number of words in each vocabulary 30, $36_1$–$36_n$, and 38 will vary from vocabulary to vocabulary. Similarly, while each vocabulary 30, $36_1$–$36_n$ or 38 typically represents one or more spoken words, each may represent individual words, names, phrases, sounds, or other representations of auditory information. Any of vocabularies 30, $36_1$–$36_n$, or 38 may be loaded into active vocabulary memory 24. As will be appreciated, active vocabulary memory 24 is large enough to accommodate the largest vocabulary within the library of vocabularies 30, $36_1$–$36_n$, and 38 in inactive vocabulary memory 26.

Vocabulary 30 is referred to as an initial vocabulary, and is used to select a working vocabulary matched to the speaker's language, dialect or environment. That is, each of vocabularies $36_1$–$36_n$ correspond to words that optimally match a speaker speaking a particular language, or with a particular dialect, accent or in a particular environment. For example words in vocabulary 30 may correspond to a word having a particular meaning and spoken in a plurality of languages; in a number of dialects; in the presence of a variety of background noise (as for example produced by a cellular phone; a car; an airplane; machinery; crowds or the like); or having a variety of accents. As detailed below, each of vocabularies $36_1$–$36_n$ also best matches a word in vocabulary 30. Vocabulary 38 is referred to as a re-evaluation vocabulary, and like vocabulary 30 represents words used to match a vocabulary $36_1$–$36_n$ to the language, dialect or environment of the speaker. Vocabulary 38 is used in the event that the match determined using vocabulary 30 is not optimal.

Figure 4:
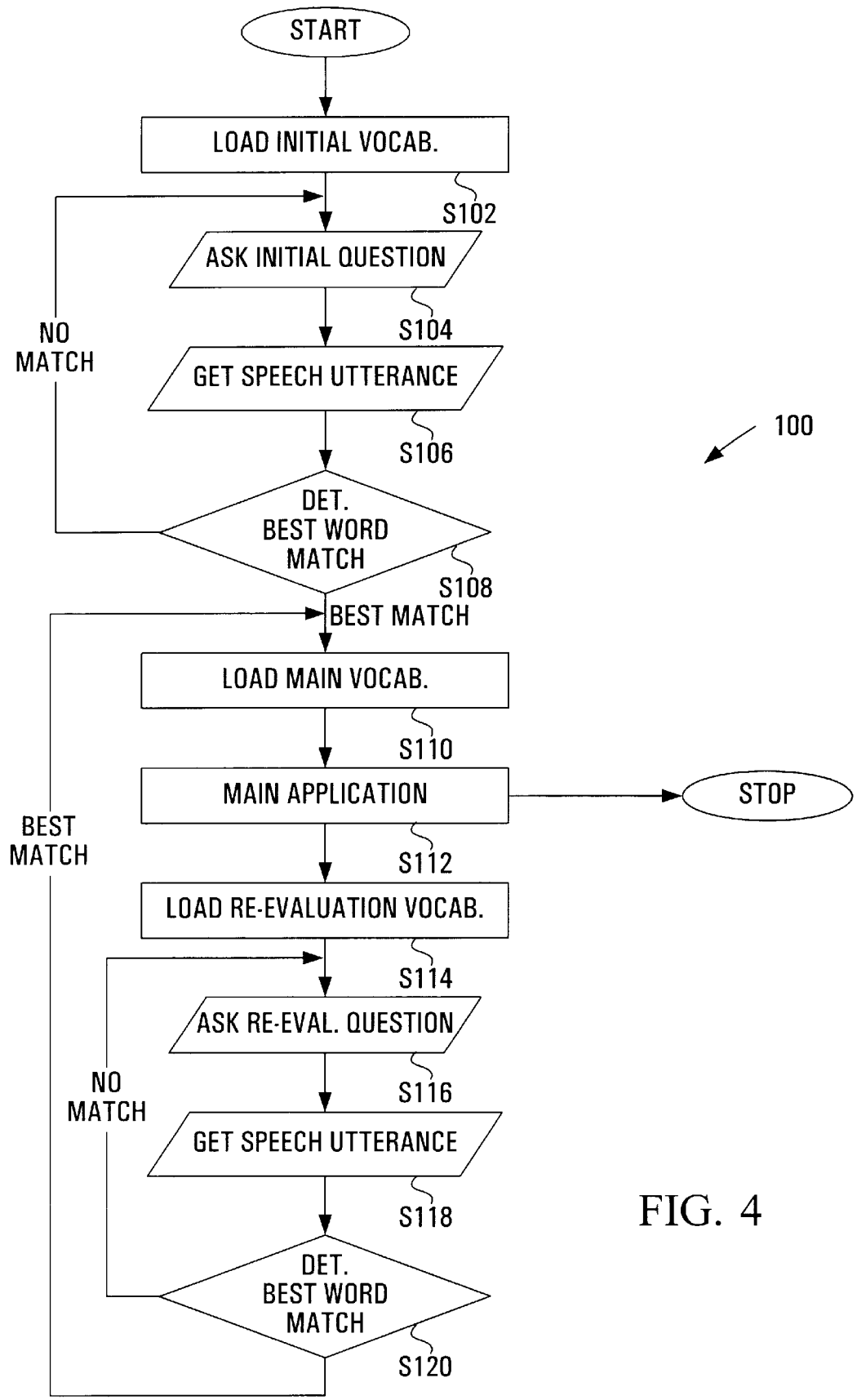
FIG. 4 is a flow chart illustrating steps in selecting a speech recognition vocabulary, in accordance with an aspect of the present invention.

FIG. 4 illustrates the steps in a program 100 executed by CPU 12 (FIG. 1) when system 10 is in operation. In operation, system 10 establishes a session with a speaker. The session may be established in any number of ways, and preferably once the presence of a speaker is detected at telephone 28. For example, the session may be established once the handset is picked up; by requiring the speaker to interact with a terminal, or other input device; after the speaker dials a specified number; or by detecting the presence of speech at the microphone of telephone 28.

In step S102, at the beginning of a session, CPU 12 is directed to load predefined initial vocabulary 30 from the inactive vocabulary memory 26 into active vocabulary memory 24.

In step S104, after the initial vocabulary 30 has been loaded into active vocabulary memory 24, from inactive vocabulary memory 26 CPU 12 generates a question audible at the handset of telephone 28. A digitized form of the question is stored within program memory 20, and digitized at D/A converter portion of converter 18. As will be appreciated, a speech synthesizer could be used instead. Alternatively, the question could be asked using a terminal or visual display, or an answer need not be prompted explicitly. For example, program 100 could simply await a spoken utterance. In any event, use of a question prompts the speaker to respond with a spoken answer in a predictable way at the microphone of telephone 28. Initial vocabulary 30 loaded in active vocabulary memory 24 contains all words that the speaker is expected to speak in response to the initial question posed in step S104.

Once the question has been asked, system 10 awaits and samples a speech utterance from the speaker at the microphone of telephone 28, in step S106. Speech sampled in step S106 is stored in temporary storage memory 22. In step S108, CPU 12 determines which word in the initial vocabulary best matches the utterance, using conventional speech recognition techniques. As well, a confidence indicator of the accuracy of the match is calculated. Again, the confidence indicator is calculated using known techniques. Specifically, CPU 12 analyzes the samples, representative of the utterance. CPU 12 then, in turn, compares the samples with entries in the initial vocabulary 30, stored within memory 24. CPU 12 calculates for each word within the vocabulary 30 the corresponding "confidence score". The higher the confidence score, the better the CPU 12 believes the utterance matches the corresponding word in vocabulary 30. If all of the confidence scores are below a certain threshold, then the program 100 is considered to have found no match for a word within the initial vocabulary 30. As illustrated, CPU 12 causes the method to re-ask the initial question if no match is found within a certain level of confidence. The necessary threshold of the confidence level required to continue may be coded as part of program 100 or may be variable by a system administrator.

If a match is found with significant confidence, CPU 12 loads a vocabulary from vocabularies $36_1$–$36_n$, corresponding to the word matched, from inactive vocabulary memory 26 into active vocabulary memory 24, in step S110. This vocabulary is referred to as the "Working Vocabulary".

Specifically, program 100 maps each word in the initial vocabulary 30 to a particular vocabulary of the library of vocabularies 36a–36n stored in inactive vocabulary memory 26, as best illustrated in FIG. 3. For example, if "Word 3" in the initial vocabulary 30 is the best match determined in step S108, then program 100 causes CPU 12 to load corresponding vocabulary $36_n$ the current working vocabulary into active vocabulary memory 24, thereby replacing initial vocabulary 30 in memory 24. It will, of course be appreciated that program 100 could simply adapt CPU 12 to load a memory pointer to point to the working vocabulary within memory 26, without transferring each byte to memory 24.

As will be apparent, there is an n-to-1 mapping of words in the initial vocabulary 30 to vocabularies $36_1$–$36_n$ in the library: each word in the initial vocabulary 30 maps to exactly one vocabulary $36_1$–$36_n$, as illustrated in FIG. 3. However, each vocabulary 36a–36n, could be mapped to by one or more words within the initial vocabulary 30. As such, the number of words in vocabulary 30 need not equal the total number of vocabularies, $36_1$–$36_n$.

Once an appropriate working vocabulary is loaded into active vocabulary memory 24, the main voice recognition application in step S112 is performed by CPU 12. The main application in step S112 typically comprises a number of conventional speech recognition steps, including possibly the prompting of answers, and recognition and assessment of the answers. Under normal circumstances, the program 100 can continue its interactions with the speaker as part of step S112, throughout the session until it terminates normally.

As well, a confidence score for each word may be calculated. If the confidence score for recognized words falls below a selected threshold, this may be an indication that the current working vocabulary may be inappropriate. Of course, depending on the application higher or lower confidence levels may be appropriate. The working vocabulary may be inappropriate because, the speaker's environment may have changed; the word matched in step S108 may have been an inappropriate indicator of the speaker's dialect, accent or environment; or the speaker may have changed. Confidence scores of at least 85% will typically be appropriate. If confidence scores fall below the threshold, program 100 temporarily suspends execution of main application S112 and proceeds to step S114.

To attempt to increase speech recognition performance during the session, program 100 directs system 10 to re-evaluate the choice of working vocabularies from vocabularies $36_1$–$36_n$ to determine a more appropriate working vocabulary in steps S114 to S120. As such, program 100 loads re-evaluation vocabulary 38 from inactive vocabulary memory 26 into active vocabulary 24 in step S114. The previous working vocabulary is thus replaced with the re-evaluation vocabulary 38 in active vocabulary memory 24.

In step S116, program 100 causes CPU 12 to present an audible re-evaluation question that once again prompts the speaker to respond in a predictable way. The question may be presented in the same way as the initial question is presented in step S104. Words forming predicted responses are stored within re-evaluation vocabulary 38. As with the initial vocabulary 30, there is an n-to-1 mapping of words in the re-evaluation vocabulary 38 to vocabularies $36_1$–$36_n$. Each word is mapped to a single vocabulary 36a–36n. Re-evaluation vocabulary 38, however, typically represents different spoken words than initial vocabulary 30. Similarly the re-evaluation question asked in step S116 is typically different from the initial question asked in step S104. As well, the mapping of words within the re-evaluation vocabulary 38 to vocabularies $36_1$–$36_n$ will also likely be different. For example, as illustrated in FIG. 3, if "Word 2'" in the re-evaluation vocabulary 38 is matched, then vocabulary $36_1$ should be used as a working vocabulary, which would be loaded as the working vocabulary into memory 24.

The re-evaluation vocabulary 38 and the re-evaluation question could, in fact, be the same as initial vocabulary 30 and the initial question asked in step S104. If the response to the re-evaluation question results in exactly the same working vocabulary as matched in step S108 being matched, the application may wish to pursue other recovery handling alternatives, not illustrated.

The re-evaluation vocabulary and questions, could perhaps be dependent on other available inputs. For example, if the recognition system forms is interconnected with a telephone, the geographic origin of a caller as determined by caller ID information could be used to choose the re-evaluation question or vocabulary. Alternatively, a series of re-evaluation questions could be asked in an effort to determine an optimal working vocabulary. It may also be of benefit to ask a different question if responses to the initial or re-evaluation questions are unsuccessful in obtaining a match within the initial or re-evaluation vocabulary. Thus, for example, the re-evaluation question could be chosen from a number of suitable re-evaluation questions stored within program memory 20.

It may be further desirable, for the re-evaluation question to be worded such that it has a high likelihood of determining exactly which of the working vocabulary sets, $36_1$–$36_n$, would be most appropriate for the speaker to use under the current circumstances. For example, an initial question might prompt for a simple "yes" or "no" answer, while a re-evaluation question might prompt more direct answers from the speaker.

Once the re-evaluation question has been asked in step S116, system 10 waits for and samples a speech utterance from the speaker in step S118, in response to the re-evaluation question. Once the answer is uttered into the microphone of telephone 28 samples are stored within temporary storage memory 22.

In step S120, CPU 12 attempts to determine which word in re-evaluation vocabulary 38, best matches the sample utterance. If no match can be found within a certain confidence score, the re-evaluation question in step S116 is asked again, and steps S118 and S120 are repeated.

If a match is found, then the application returns to step S110 and loads a new corresponding working vocabulary from memory 26, and thereafter resumes with the main program in step S112. Of course, the entire main program S112 need not necessarily be repeated. If certain responses were satisfactorily recognized, those responses need not be solicited again.

At the completion of a session, main program 100 exits.

System 10 can also easily be adapted to offer a speaker a variety of options depending on the assessed dialect, accent or identity, of the speaker. For example, if Spanish accented English is detected, the system could offer the speaker the choice of dealing with the system in the Spanish language, in main application step S112.

As will further be appreciated, use of the described method is not limited to discrete (single word) speech recognition systems. The method may easily be adapted to continuous or natural language speech recognition. Similarly, the method need not process the same steps for each selected working vocabulary. It may be desirable, for example, for some applications to partition the working vocabulary in a manner dependent on the selected vocabulary or to use particular words within the vocabulary to better handle a particular dialect, language, accent or environment. So, for example, questions may be phrased so that responses do not sound similar in the chosen vocabulary. Similarly vocabularies could be partitioned into sub-vocabularies having words that are easily distinguished.

Additionally each working vocabulary loaded from inactive memory 26 could be further subdivided and may contain one or more vocabularies. In the simplest case, each working vocabulary is actually a single complete vocabulary. Alternatively, each working vocabulary may contain numerous smaller vocabularies, each suitable for response to a single question.

As well, for clarity, error handling has been omitted from the described embodiment. A person skilled in the art will appreciate that program 100 can be suitably modified so that if the application continues to be unable to match words in the vocabulary, or never gets an utterance from the speaker. These situations would need to be handled appropriately by the application.

Program 100 may be used in both speaker independent and speaker dependent speech recognition systems. In a speaker dependent system initial vocabulary 30 and re-evaluation vocabulary 38 would contain words spoken by different speakers. These words would, in turn, map to a corresponding vocabulary in vocabularies $36_1$–$36_n$ which has been trained by the recognized speaker. Vocabularies $36_1$–$36_n$ would, in turn, correspond to vocabularies trained by different speakers.

It will be understood that the invention is not limited to the illustrations described herein which are merely illustrative of a preferred embodiment of carrying out the invention, and which are susceptible to modifications of form, size, arrangement of parts, and details and order of operation. The invention, rather, is intended to encompass all such modification within its spirit and scope, as defined by the claims.

We claim:

1. A method of recognizing speech at a speech recognition system using a plurality of speech recognition vocabularies, comprising:

selecting a working speech recognition vocabulary for recognizing speech from said plurality of speech recognition vocabularies based on a response by a user to an initial prompt;

receiving a spoken word to be recognized;

responding to determining a low likelihood of correctly recognizing said spoken word using said working speech recognition vocabulary by selecting another one of said plurality of speech recognition vocabularies, based on a response to a subsequent prompt, for use as said working speech recognition vocabulary;

said method further comprising presenting said user an option of receiving future prompts in a second language different from a language of said initial prompt based on a response to at least one of said initial prompt and said subsequent prompt.

2. The method of claim 1, wherein said response to said initial prompt is spoken by said user and compared to an initial speech recognition vocabulary to select said working speech recognition vocabulary.

3. The method of claim 2, wherein said response to said subsequent prompt is spoken by said user and compared to a re-evaluation vocabulary different from said initial speech recognition vocabulary to select said another one of said plurality of speech recognition vocabularies.

4. The method of claim 3, wherein said option is one of a plurality of options presented to said user based on at least one of a best match to said response to said initial prompt in said initial speech recognition vocabulary and a best match to said response to said subsequent prompt in said re-evaluation vocabulary.

5. The method of claim 1, wherein said second language is related to said working speech recognition vocabulary.

6. The method of claim 1, wherein said speech recognition system is a speaker independent speech recognition system.

7. The method of claim 6, wherein each of said plurality of vocabularies is optimized for recognition of speech having a particular dialect or accent.

8. The method of claim 1, wherein said subsequent prompt prompts said user for input used to choose said another one of said plurality of speech recognition vocabularies.

9. The method of claim 1, wherein said initial and subsequent prompts are audibly presented to said user.

10. The method of claim 1, wherein said initial and subsequent prompts are audibly presented to said user by way of a telephone network.

11. A speech recognition system, comprising
a processor;
an input device in communication with said processor;
a memory device in communication with said processor, said memory device storing data corresponding to a plurality of distinct speech recognition vocabularies;
said processor adapted to:
- select a working speech recognition vocabulary for recognizing speech from said plurality of speech recognition vocabularies based on a response by a user to an initial prompt;
- receive data representative of a spoken word to be recognized;
- respond to determining a low likelihood of correctly recognizing said spoken word using said working speech recognition vocabulary by selecting another one of said plurality of speech recognition vocabularies, based on a response to a subsequent prompt, for use as said working speech recognition vocabulary;

said processor further adapted to present said user an option of receiving future prompts in a second language different from a language of said initial prompt based on a response to at least one of said initial prompt and said subsequent prompt.

12. The system of claim 11, further comprising a digital to analog converter to audibly present said initial and subsequent prompts to said user.

13. The system of claim 11, further comprising an analog to digital converter for receiving said data from an analog signal.

14. The system of claim 13, wherein said system is a speaker independent speech recognition system.

15. The system of claim 14, wherein each of said plurality of vocabularies is optimized for recognition of speech having a particular dialect or accent.

16. The system of claim 11, further comprising an interface to the public telephone network, to receive said spoken word by way of said public telephone network.

17. A method of recognizing speech at a speech recognition system using a plurality of speech recognition vocabularies, said method comprising:
- receiving a response to an initial prompt from a user, said response used to select one of said plurality of speech recognition vocabularies to recognize speech;
- based on said response, presenting said user an option of receiving subsequent prompts in a language different from said initial prompt.

* * * * *